(12) United States Patent
Chae et al.

(10) Patent No.: US 12,096,895 B2
(45) Date of Patent: Sep. 24, 2024

(54) ARTIFICIAL INTELLIGENCE ROBOT AND METHOD OF OPERATING THE SAME

(71) Applicant: LG ELECTRONICS INC., Seoul (KR)

(72) Inventors: Jonghoon Chae, Seoul (KR); Beomoh Kim, Seoul (KR); Taehyun Kim, Seoul (KR); Jichan Maeng, Seoul (KR); Wonho Shin, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 1009 days.

(21) Appl. No.: 16/963,822

(22) PCT Filed: Jun. 14, 2019

(86) PCT No.: PCT/KR2019/007222
§ 371 (c)(1),
(2) Date: Jul. 21, 2020

(87) PCT Pub. No.: WO2020/251096
PCT Pub. Date: Dec. 17, 2020

(65) Prior Publication Data
US 2021/0401255 A1 Dec. 30, 2021

(51) Int. Cl.
*A47L 11/40* (2006.01)
*B25J 9/00* (2006.01)
(Continued)

(52) U.S. Cl.
CPC ......... *A47L 11/4011* (2013.01); *B25J 9/0003* (2013.01); *B25J 11/0085* (2013.01);
(Continued)

(58) Field of Classification Search
CPC ............. A47L 11/4011; A47L 2201/04; A47L 9/2805; A47L 2201/06; B25J 9/0003;
(Continued)

(56) References Cited

U.S. PATENT DOCUMENTS 10,913,148 B2 * 2/2021 Williams ............... G05D 1/028
2018/0079081 A1 * 3/2018 Chen ..................... B25J 9/0003

FOREIGN PATENT DOCUMENTS

JP 2018030223 3/2018
KR 20130030932 3/2013
(Continued)

OTHER PUBLICATIONS

PCT International Application No. PCT/KR2019/007222, International Search Report dated Mar. 13, 2020, 8 pages.

*Primary Examiner* — Jaime Figueroa
*Assistant Examiner* — Sihar A Karwan
(74) *Attorney, Agent, or Firm* — LEE, HONG, DEGERMAN, KANG & WAIMEY

(57) ABSTRACT

An artificial intelligence robot includes a camera configured to acquire image data, a memory configured to store an object recognition model used to recognize an object from the image data, and a processor configured to acquire a speech command, determine whether an intention of the acquired speech command is object search, recognize an object from the image data based on the object recognition model during traveling when the intention of object search, and output a notification indicating that the object has been recognized when the recognized object is an intended object.

10 Claims, 11 Drawing Sheets

(51) Int. Cl.
  *B25J 11/00* (2006.01)
  *B25J 13/00* (2006.01)
  *B25J 19/02* (2006.01)
  *G06N 20/00* (2019.01)
  *H04W 4/80* (2018.01)

(52) U.S. Cl.
  CPC ........... *B25J 13/003* (2013.01); *B25J 13/006* (2013.01); *B25J 19/023* (2013.01); *G06N 20/00* (2019.01); *H04W 4/80* (2018.02); *A47L 2201/04* (2013.01)

(58) Field of Classification Search
  CPC .... B25J 11/0085; B25J 13/003; B25J 13/006; B25J 19/023; B25J 9/1664; B25J 9/1679; B25J 19/00; G06N 20/00; G06N 3/08; H04W 4/80; G05D 1/0246; G05D 2201/0203
  See application file for complete search history.

(56) References Cited

FOREIGN PATENT DOCUMENTS

| | | |
|---|---|---|
| KR | 101553522 | 9/2015 |
| KR | 20180058511 | 6/2018 |
| KR | 20190056174 | 5/2019 |

\* cited by examiner

FIG. 8
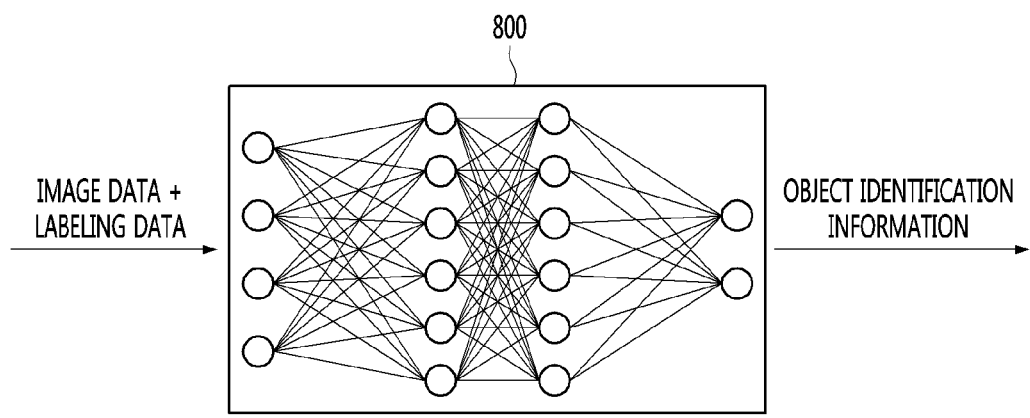
FIG. 9
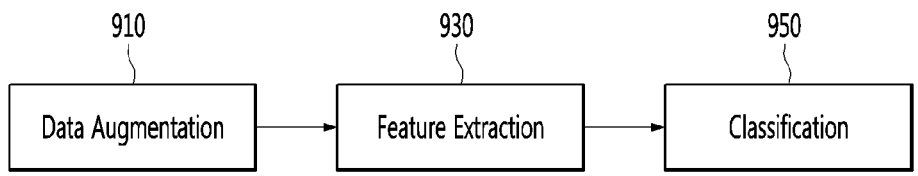
FIG. 10
| Item No. | Label | COORDINATES |
|---|---|---|
| 1 | REMOTE CONTROLLER | 0, 3 |
| 2 | RING | 2, 1 |
| 3 | REMOTE CONTROLLER | 5, 2 |

ARTIFICIAL INTELLIGENCE ROBOT AND METHOD OF OPERATING THE SAME

CROSS-REFERENCE TO RELATED APPLICATIONS

This application is the National Stage filing under 35 U.S.C. 371 of International Application No. PCT/KR2019/007222, filed on Jun. 14, 2019, the contents of which are all hereby incorporated by reference herein in their entirety.

TECHNICAL FIELD

The present invention relates to an artificial intelligence robot and, more particularly, to an artificial intelligence robot capable of searching for a lost object during cleaning.

BACKGROUND ART

In general, a cleaner refers to an apparatus for sucking in air including dust using suction force generated by a suction motor mounted in a main body and filtering dust inside the main body.

Recently, robot cleaners for automatically performing cleaning without being necessary for a user to carry a cleaner manually have appeared.

A robot cleaner refers to an apparatus for sucking in foreign materials such as dust from a floor surface to automatically perform cleaning while autonomously traveling in an area to be cleaned without operation of a user.

A conventional robot cleaner recognized a relatively large object through a camera and performed cleaning while avoiding the recognized object.

However, the robot cleaner may suck in a relatively small object such as a neglected ring and, otherwise, may just pass the relatively small object by.

Accordingly, the function of the robot cleaner is limited to cleaning.

DISCLOSURE

Technical Problem

An object of the present invention devised to solve the problem lies in an artificial intelligence robot capable of recognizing an object corresponding to a command uttered by a user during cleaning.

Another object of the present invention devised to solve the problem lies in an artificial intelligence robot capable of recognizing an object corresponding to a command uttered by a user and grasping and providing a position of the recognized object to a user.

Technical Solution

An artificial intelligence robot according to an embodiment of the present invention can recognize an object corresponding to an intention of a speech command of a user based on image data and output the position of the recognized object.

An artificial intelligence robot according to an embodiment of the present invention can transmit a cleaning map including the position of an object corresponding to an intention of a speech command of a user to a mobile terminal of the user.

Advantageous Effects

According to the embodiment of the present invention, a user can easily find an object which the user wants to find, only by simple utterance, thereby improving convenience.

According to the embodiment of the present invention, the user can confirm an exact position of an object which the user wants to find, and easily find the object at that position.

DESCRIPTION OF DRAWINGS

FIGS. 8 and 9 are views illustrating a process of learning an object recognition model according to an embodiment of the present invention.

FIG. 10 is a view illustrating a table including object identification information and position information of an object on a cleaning map, which are acquired by an artificial intelligence robot of the present invention.

BEST MODE

<Artificial Intelligence (AI)>

Figure 1:
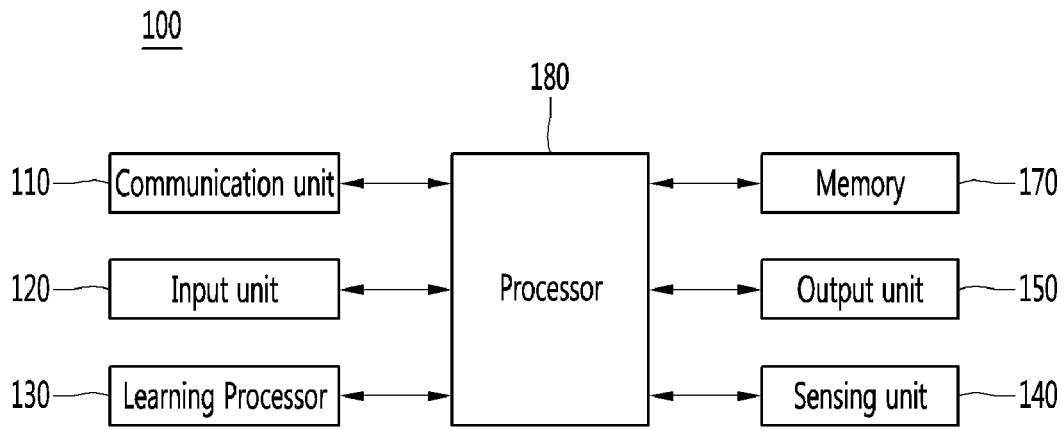
FIG. 1 is a diagram showing an artificial intelligence (AI) device according to an embodiment of the present invention.

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep running is part of machine running. In the following, machine learning is used to mean deep running.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

At this time, the self-driving vehicle may be regarded as a robot having a self-driving function.

<eXtended Reality (XR)>

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are shown together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

FIG. 1 illustrates an AI device 100 according to an embodiment of the present invention.

The AI device 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication unit 110, an input unit 120, a learning processor 130, a sensing unit 140, an output unit 150, a memory 170, and a processor 180.

The communication unit 110 may transmit and receive data to and from external devices such as other AI devices 100a to 100e and the AI server 200 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input unit 120 may acquire various kinds of data.

At this time, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a learning data for model learning and an input data to be used when an output is acquired by using learning model. The input unit 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 130 may perform AI processing together with the learning processor 240 of the AI server 200.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensing unit 140 may acquire at least one of internal information about the AI device 100, ambient environment information about the AI device 100, and user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense.

At this time, the output unit 150 may include a display unit for outputting time information, a speaker for outputting auditory information, and a haptic module for outputting haptic information.

The memory 170 may store data that supports various functions of the AI device 100. For example, the memory 170 may store input data acquired by the input unit 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

Figure 2:
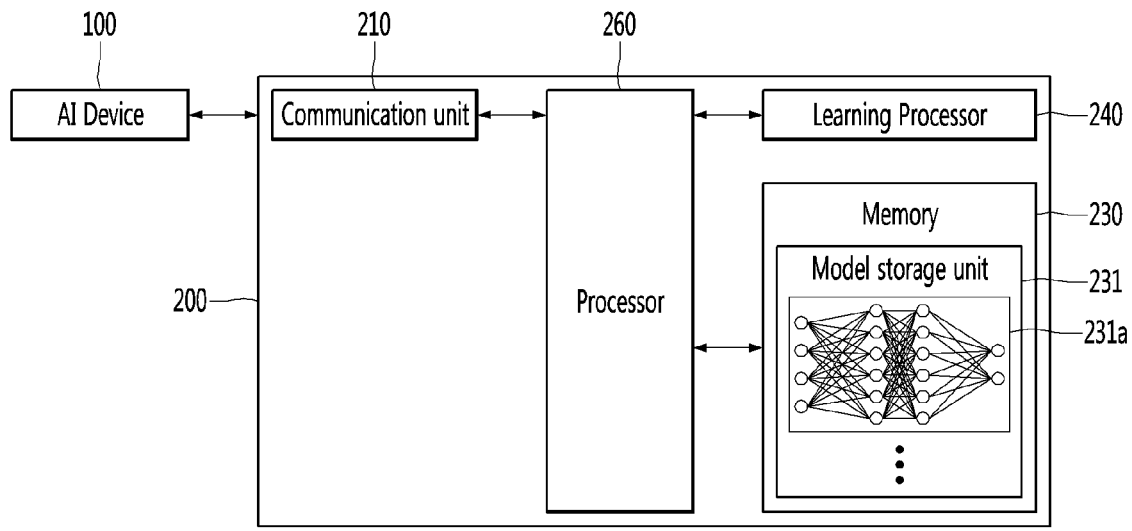
FIG. 2 is a diagram showing an AI server according to an embodiment of the present invention.

FIG. 2 illustrates an AI server 200 according to an embodiment of the present invention.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. At this time, the AI server 200 may be included as a partial configuration of the AI device 100, and may perform at least part of the AI processing together.

The AI server 200 may include a communication unit 210, a memory 230, a learning processor 240, a processor 260, and the like.

The communication unit 210 can transmit and receive data to and from an external device such as the AI device 100.

The memory 230 may include a model storage unit 231. The model storage unit 231 may store a learning or learned model (or an artificial neural network 231a) through the learning processor 240.

The learning processor 240 may learn the artificial neural network 231a by using the learning data. The learning model may be used in a state of being mounted on the AI server 200 of the artificial neural network, or may be used in a state of being mounted on an external device such as the AI device 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
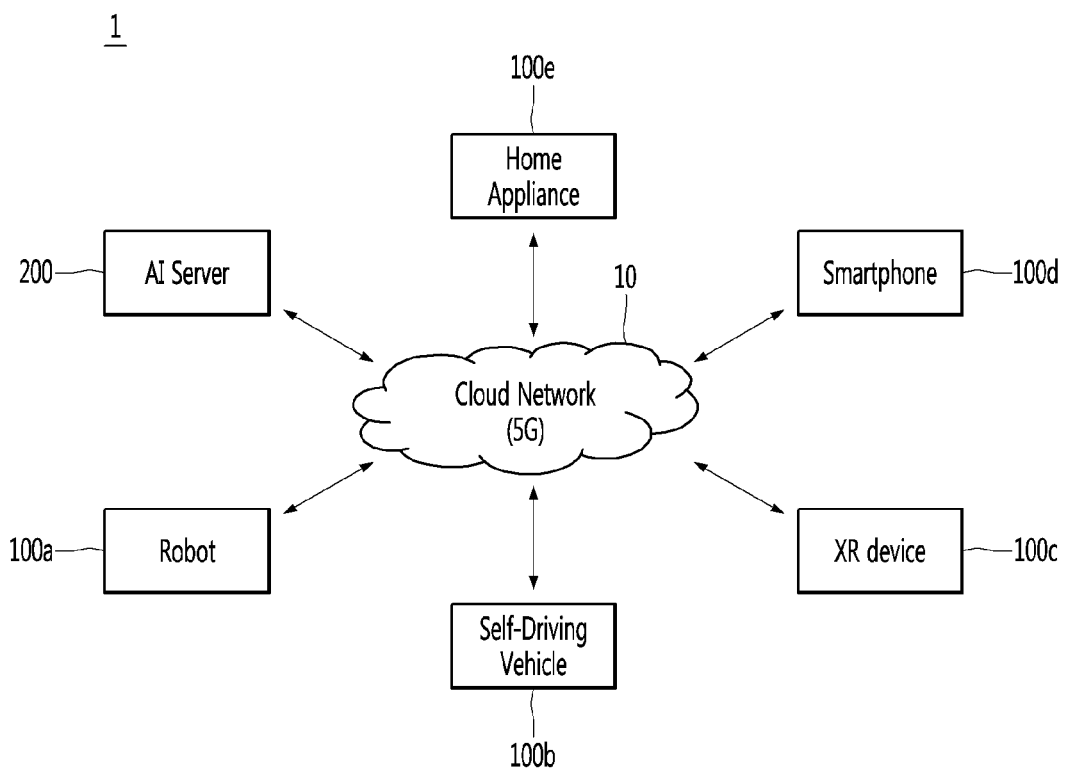
FIG. 3 is a diagram showing an AI system according to an embodiment of the present invention.

FIG. 3 illustrates an AI system 1 according to an embodiment of the present invention.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI devices 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI devices constituting the AI system 1, that is, the robot 100a, the self-driving vehicle 100b, the XR device 100c, the smartphone 100d, or the home appliance 100e through the cloud network 10, and may assist at least part of AI processing of the connected AI devices 100a to 100e.

At this time, the AI server 200 may learn the artificial neural network according to the machine learning algorithm instead of the AI devices 100a to 100e, and may directly store the learning model or transmit the learning model to the AI devices 100a to 100e.

At this time, the AI server 200 may receive input data from the AI devices 100a to 100e, may infer the result value for the received input data by using the learning model, may generate a response or a control command based on the inferred result value, and may transmit the response or the control command to the AI devices 100a to 100e.

Alternatively, the AI devices 100a to 100e may infer the result value for the input data by directly using the learning model, and may generate the response or the control command based on the inference result.

Hereinafter, various embodiments of the AI devices 100a to 100e to which the above-described technology is applied will be described. The AI devices 100a to 100e illustrated in FIG. 3 may be regarded as a specific embodiment of the AI device 100 illustrated in FIG. 1.

<AI+Robot>

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

At this time, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external apparatus to determine the travel route and the travel plan, and may control the driving unit such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving unit based on the control/interaction of the user. At this time, the robot 100a may acquire the intention information of the interaction due to the user's operation or speech utterance, and may determine the response based on the acquired intention information, and may perform the operation.

<AI+Self-Driving>

The self-driving vehicle 100b, to which the AI technology is applied, may be implemented as a mobile robot, a vehicle, an unmanned flying vehicle, or the like.

The self-driving vehicle 100b may include a self-driving control module for controlling a self-driving function, and the self-driving control module may refer to a software module or a chip implementing the software module by hardware. The self-driving control module may be included in the self-driving vehicle 100b as a component thereof, but may be implemented with separate hardware and connected to the outside of the self-driving vehicle 100b.

The self-driving vehicle 100b may acquire state information about the self-driving vehicle 100b by using sensor information acquired from various kinds of sensors, may detect (recognize) surrounding environment and objects, may generate map data, may determine the route and the travel plan, or may determine the operation.

Like the robot 100a, the self-driving vehicle 100b may use the sensor information acquired from at least one sensor among the lidar, the radar, and the camera so as to determine the travel route and the travel plan.

In particular, the self-driving vehicle 100b may recognize the environment or objects for an area covered by a field of view or an area over a certain distance by receiving the sensor information from external devices, or may receive directly recognized information from the external devices.

The self-driving vehicle 100b may perform the above-described operations by using the learning model composed of at least one artificial neural network. For example, the self-driving vehicle 100b may recognize the surrounding environment and the objects by using the learning model, and may determine the traveling movement line by using the recognized surrounding information or object information. The learning model may be learned directly from the self-driving vehicle 100a or may be learned from an external device such as the AI server 200.

At this time, the self-driving vehicle 100b may perform the operation by generating the result by directly using the learning model, but the sensor information may be transmitted to the external device such as the AI server 200 and the generated result may be received to perform the operation.

The self-driving vehicle 100b may use at least one of the map data, the object information detected from the sensor information, or the object information acquired from the external apparatus to determine the travel route and the travel plan, and may control the driving unit such that the self-driving vehicle 100b travels along the determined travel route and travel plan.

The map data may include object identification information about various objects arranged in the space (for example, road) in which the self-driving vehicle 100b travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100b may perform the operation or travel by controlling the driving unit based on the control/interaction of the user. At this time, the self-driving vehicle 100b may acquire the intention information of the interaction due to the user's operation or speech utterance, and may determine the response based on the acquired intention information, and may perform the operation.

<AI+XR>

The XR device 100c, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100c may analyzes three-dimensional point cloud data or image data acquired from various sensors or the external devices, generate position data and attribute data for the three-dimensional points, acquire information about the surrounding space or the real object, and render to output the XR object to be output. For example, the XR device 100c may output an XR object including the additional information about the recognized object in correspondence to the recognized object.

The XR device 100c may perform the above-described operations by using the learning model composed of at least one artificial neural network. For example, the XR device 100c may recognize the real object from the three-dimensional point cloud data or the image data by using the learning model, and may provide information corresponding to the recognized real object. The learning model may be directly learned from the XR device 100c, or may be learned from the external device such as the AI server 200.

At this time, the XR device 100c may perform the operation by generating the result by directly using the learning model, but the sensor information may be transmitted to the external device such as the AI server 200 and the generated result may be received to perform the operation.

<AI+Robot+Self-Driving>

The robot 100a, to which the AI technology and the self-driving technology are applied, may be implemented as a guide robot, a carrying robot, a cleaning robot, a wearable robot, an entertainment robot, a pet robot, an unmanned flying robot, or the like.

The robot 100a, to which the AI technology and the self-driving technology are applied, may refer to the robot itself having the self-driving function or the robot 100a interacting with the self-driving vehicle 100b.

The robot 100a having the self-driving function may collectively refer to a device that moves for itself along the given movement line without the user's control or moves for itself by determining the movement line by itself.

The robot 100a and the self-driving vehicle 100b having the self-driving function may use a common sensing method so as to determine at least one of the travel route or the travel plan. For example, the robot 100a and the self-driving vehicle 100b having the self-driving function may determine at least one of the travel route or the travel plan by using the information sensed through the lidar, the radar, and the camera.

The robot 100a that interacts with the self-driving vehicle 100b exists separately from the self-driving vehicle 100b and may perform operations interworking with the self-driving function of the self-driving vehicle 100b or interworking with the user who rides on the self-driving vehicle 100b.

At this time, the robot 100a interacting with the self-driving vehicle 100b may control or assist the self-driving function of the self-driving vehicle 100b by acquiring sensor information on behalf of the self-driving vehicle 100b and providing the sensor information to the self-driving vehicle 100b, or by acquiring sensor information, generating environment information or object information, and providing the information to the self-driving vehicle 100b.

Alternatively, the robot 100a interacting with the self-driving vehicle 100b may monitor the user boarding the self-driving vehicle 100b, or may control the function of the self-driving vehicle 100b through the interaction with the user. For example, when it is determined that the driver is in a drowsy state, the robot 100a may activate the self-driving function of the self-driving vehicle 100b or assist the control of the driving unit of the self-driving vehicle 100b. The function of the self-driving vehicle 100b controlled by the robot 100a may include not only the self-driving function but also the function provided by the navigation system or the audio system provided in the self-driving vehicle 100b.

Alternatively, the robot 100a that interacts with the self-driving vehicle 100b may provide information or assist the function to the self-driving vehicle 100b outside the self-driving vehicle 100b. For example, the robot 100a may provide traffic information including signal information and the like, such as a smart signal, to the self-driving vehicle 100b, and automatically connect an electric charger to a charging port by interacting with the self-driving vehicle 100b like an automatic electric charger of an electric vehicle.

<AI+Robot+XR>

The robot 100a, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100a, to which the XR technology is applied, may refer to a robot that is subjected to control/interaction in an XR image. In this case, the robot 100a may be separated from the XR device 100c and interwork with each other.

When the robot 100a, which is subjected to control/interaction in the XR image, may acquire the sensor information from the sensors including the camera, the robot 100a or the XR device 100c may generate the XR image based on the sensor information, and the XR device 100c may output the generated XR image. The robot 100a may operate based on the control signal input through the XR device 100c or the user's interaction.

For example, the user can confirm the XR image corresponding to the time point of the robot 100a interworking remotely through the external device such as the XR device 100c, adjust the self-driving travel path of the robot 100a through interaction, control the operation or driving, or confirm the information about the surrounding object.

<AI+Self-Driving+XR>

The self-driving vehicle 100b, to which the AI technology and the XR technology are applied, may be implemented as a mobile robot, a vehicle, an unmanned flying vehicle, or the like.

The self-driving driving vehicle 100b, to which the XR technology is applied, may refer to a self-driving vehicle having a means for providing an XR image or a self-driving vehicle that is subjected to control/interaction in an XR image. Particularly, the self-driving vehicle 100b that is subjected to control/interaction in the XR image may be distinguished from the XR device 100c and interwork with each other.

The self-driving vehicle 100b having the means for providing the XR image may acquire the sensor information from the sensors including the camera and output the generated XR image based on the acquired sensor information. For example, the self-driving vehicle 100b may include an HUD to output an XR image, thereby providing a passenger with a real object or an XR object corresponding to an object in the screen.

At this time, when the XR object is output to the HUD, at least part of the XR object may be outputted so as to overlap the actual object to which the passenger's gaze is directed. Meanwhile, when the XR object is output to the display provided in the self-driving vehicle 100b, at least part of the XR object may be output so as to overlap the object in the screen. For example, the self-driving vehicle 100b may output XR objects corresponding to objects such as a lane, another vehicle, a traffic light, a traffic sign, a two-wheeled vehicle, a pedestrian, a building, and the like.

When the self-driving vehicle 100b, which is subjected to control/interaction in the XR image, may acquire the sensor information from the sensors including the camera, the self-driving vehicle 100b or the XR device 100c may generate the XR image based on the sensor information, and the XR device 100c may output the generated XR image. The self-driving vehicle 100b may operate based on the control signal input through the external device such as the XR device 100c or the user's interaction.

Figure 4:
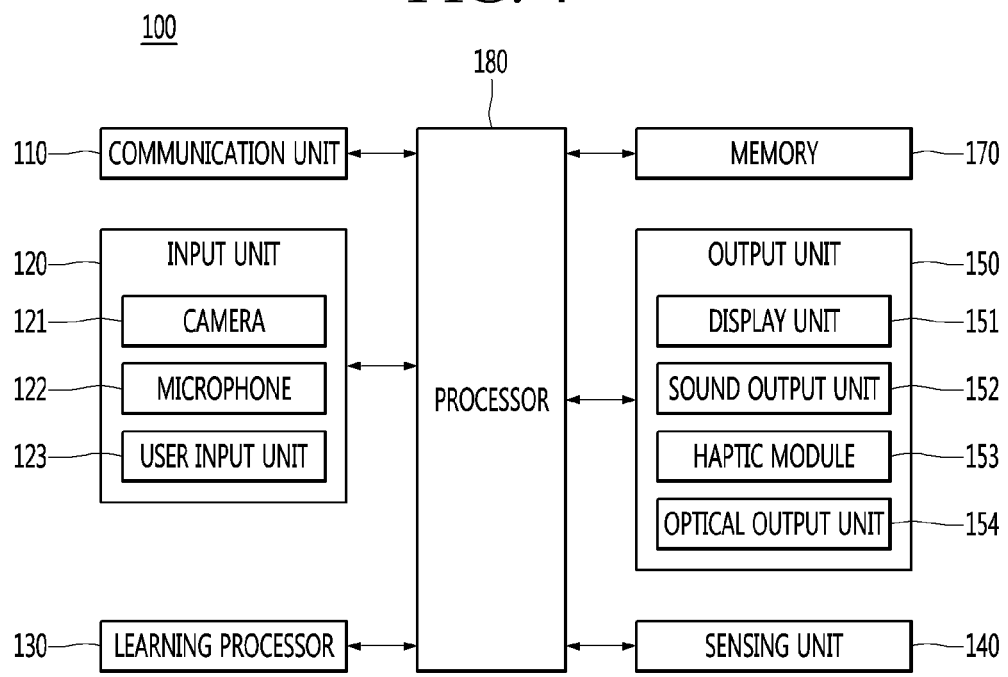
FIG. 4 is a diagram showing an AI device according to another embodiment of the present invention.

FIG. 4 shows an AI device 100 according to an embodiment of the present invention.

A repeated description of FIG. 1 will be omitted.

Referring to FIG. 4, an input unit 120 may include a camera 121 for receiving a video signal, a microphone 122 for receiving an audio signal and a user input unit 123 for receiving information from a user.

Audio data or image data collected by the input unit 120 may be analyzed and processed as a control command of the user.

The input unit 120 receives video information (or signal), audio information (or signal), data or information received from the user, and the AI device 100 may include one or a plurality of cameras 121 for input of the video information.

The camera 121 processes an image frame such as a still image or a moving image obtained by an image sensor in a video call mode or a shooting mode. The processed image frame may be displayed on a display unit 151 or stored in a memory 170.

The microphone 122 processes external acoustic signals into electrical sound data. The processed sound data may be variously utilized according to the function (or the application program) performed in the AI device 100. Meanwhile, various noise removal algorithms for removing noise generated in a process of receiving the external acoustic signal is applicable to the microphone 122.

The user input unit 123 receives information from the user. When information is received through the user input unit 123, a processor 180 may control operation of the AI device 100 in correspondence with the input information.

The user input unit 123 may include a mechanical input element (or a mechanical key, for example, a button located on a front/rear surface or a side surface of the terminal 100, a dome switch, a jog wheel, a jog switch, and the like) and a touch input element. As one example, the touch input element may be a virtual key, a soft key or a visual key, which is displayed on a touchscreen through software processing, or a touch key located at a portion other than the touchscreen.

An output unit 150 may include at least one of a display unit 151, a sound output unit 152, a haptic module 153, and an optical output unit 154.

The display unit 151 displays (outputs) information processed in the AI device 100. For example, the display unit 151 may display execution screen information of an application program executing at the AI device 100 or user interface (UI) and graphical user interface (GUI) information according to the execution screen information.

The display unit 151 may have an inter-layered structure or an integrated structure with a touch sensor so as to implement a touchscreen. The touchscreen may provide an output interface between the terminal 100 and a user, as well as functioning as the user input unit 123 which provides an input interface between the AI device 100 and the user.

The sound output unit 152 may output audio data received from a communication unit 110 or stored in the memory 170 in a call signal reception mode, a call mode, a record mode, a voice recognition mode, a broadcast reception mode, and the like.

The sound output unit 152 may include at least one of a receiver, a speaker, a buzzer or the like.

The haptic module 153 may generate various tactile effects that can be felt by a user. A representative example of tactile effect generated by the haptic module 153 may be vibration.

The optical output unit 154 may output a signal indicating event generation using light of a light source of the AI device 100. Examples of events generated in the AI device 100 may include a message reception, a call signal reception, a missed call, an alarm, a schedule notice, an email reception, an information reception through an application, and the like.

Figure 5:
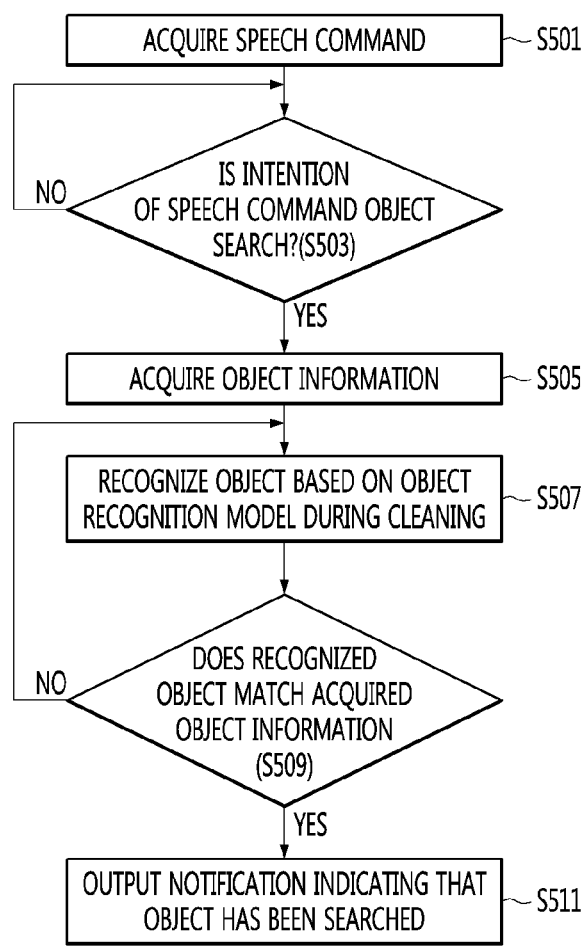
FIG. 5 is a flowchart illustrating a method of operating an artificial intelligence robot according to an embodiment of the present invention.

FIG. 5 is a flowchart illustrating a method of operating an artificial intelligence robot according to an embodiment of the present invention.

The artificial intelligence robot 100-1 includes the components of FIG. 4.

Referring to FIG. 5, the processor 180 of the artificial intelligence robot 100-1 acquires a speech command (S501).

The speech command may be a command uttered by a user.

In one embodiment, the processor 180 may directly acquire the speech command uttered by the user through the microphone 122.

In another embodiment, the processor 180 may acquire the speech command through the mobile terminal of the user. Specifically, the mobile terminal may acquire the speech command of the user and transmit the acquired speech command to the artificial intelligence robot 100-1.

To this end, the communication unit 110 of the artificial intelligence robot 100-1 may perform short-range wireless communication with the mobile terminal. That is, the communication unit 110 may include a short-range communication module according to the short-range communication standard such as Wi-Fi or Bluetooth.

The processor 180 may acquire speech data corresponding to the speech command.

Figure 6:
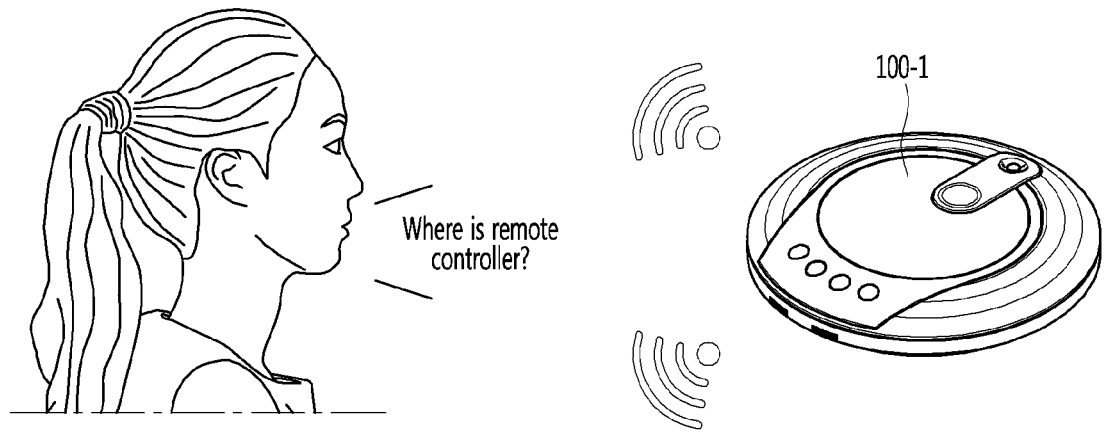
FIGS. 6 and 7 are views illustrating a process of acquiring a speech command of a user at an artificial intelligence robot according to an embodiment of the present invention.
Figure 7:
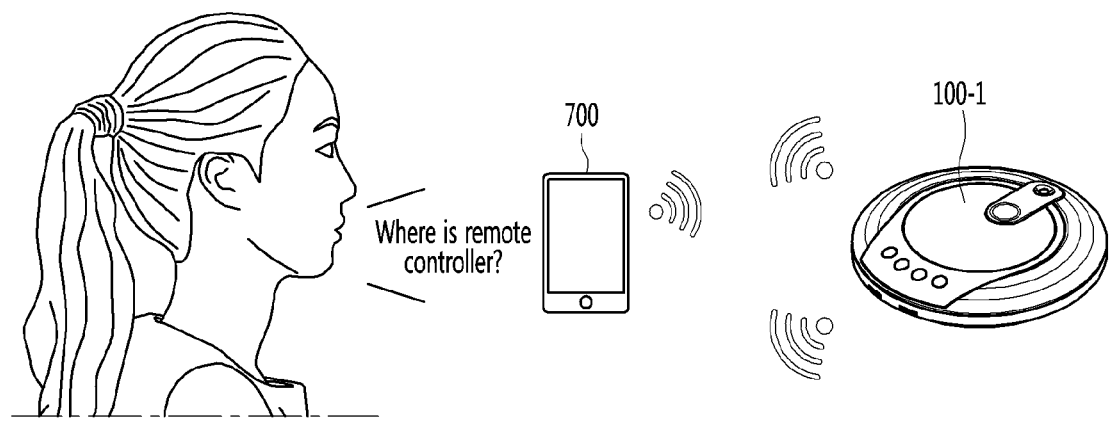

FIGS. 6 and 7 are views illustrating a process of acquiring a speech command of a user at an artificial intelligence robot according to an embodiment of the present invention.

FIG. 6 is a view illustrating a situation in which the artificial intelligence robot 100-1 directly acquires the speech command uttered by the user, and FIG. 7 is a view illustrating a situation in which the artificial intelligence robot receives the speech command from the mobile terminal.

In FIGS. 6 and 7, assume that the user utters <where is remote controller> by voice.

Referring to FIG. 6, the artificial intelligence robot 100-1 may receive the speech command of the user through the microphone (not shown).

Referring to FIG. 7, the mobile terminal 700 of the user may receive the speech command uttered by the user and transmit the received speech command to the artificial intelligence robot 100-1.

The mobile terminal 700 may include all the components of FIG. 4.

The mobile terminal 700 may directly analyze the intention of the speech command and determine that a target, to which the speech command will be transmitted, is the artificial intelligence robot 100-1, when the analyzed intention is object search.

FIG. 5 will be described again.

The processor 180 analyzes the intention of the acquired speech command and determines whether the intention of the speech command is object search according to the result of analysis (S503).

The processor 180 may convert speech data corresponding to the speech command into text data using a speech-text conversion engine.

The speech-text conversion engine may be included in the processor 180.

The processor 180 may analyze the intention of the converted text data using a natural language processing engine provided therein.

The processor 180 may transmit the speech data to an external natural language processing server and receive the result of analyzing the intention of the speech data from the natural language processing server.

The processor 180 may determine whether the intention of the speech command is object search, based on the result of analyzing the intention of the speech data.

When the intention of the speech command is object search, the processor 180 acquires object information corresponding to the intention of the speech command (S505).

The object information may be object identification information for identifying the object.

The object identification information may be the name of the object or the type of the object.

The processor 180 recognizes the object based on a prestored object recognition model during cleaning along a cleaning route (S507).

The artificial intelligence robot 100-1 may perform cleaning while traveling along a predetermined cleaning route.

The object recognition model may be an artificial neural network model learned using a deep learning algorithm or a machine learning algorithm.

The object recognition model may recognize a specific object from image data acquired through the camera 121.

In one embodiment, the object recognition model may be received from the AI server 200 of FIG. 2 and stored in the memory 170.

In another embodiment, the object recognition model may be learned by the learning processor 130 of FIG. 4.

Meanwhile, when the object is recognized, the processor 180 may store the position of the object in the memory 170 along with the object identification information. The position of the object may include coordinates of the position of the object on a cleaning map stored in the artificial intelligence robot 100-1.

The object recognition model will be described with reference to FIGS. 8 and 9.

FIGS. 8 and 9 are views illustrating a process of learning an object recognition model according to an embodiment of the present invention.

The object recognition model 800 may be an artificial neural network model learned by a machine learning algorithm or a deep learning algorithm.

The object recognition model 800 may be learned through supervised learning.

The learning data used to learn the object recognition model 800 may include image data and labeling data.

The labeling data may be correct answer data to be inferred by the object recognition model 900 and may be data labeled with the image data. The labeling data may be object identification information for identifying the object.

The object identification information may be information for identifying a class to which the object belongs. For example, the object identification information may be information indicating the type of the object, such as valuables, a cellular phone or a remote controller.

The object recognition model 800 may be a model learned to infer the object identification information indicating a feature point using the image data as input data.

The loss function or cost function of the object recognition model may be expressed as a square mean of a difference between a label which is the object identification information corresponding to each image data and the inferred object identification information.

When an input feature vector is extracted from image data for learning and input to the object recognition model 800, a determined result of the object identification information may be output as a target feature vector.

In this case, the object recognition model 800 may be learned to minimize a loss function corresponding to the output target feature vector and the labeled data.

The object recognition model 800 may be learned by the AI server 200 of FIG. 2 and installed in the artificial intelligence robot 100-1. That is, the AI server 200 may transmit the learned object recognition model 200 to the artificial intelligence robot 100-1.

Referring to FIG. 9, the process of identifying the object of the object recognition model 800 is shown.

First, the object identification process may include a data augmentation step 910, a feature extraction step 930 and a classification step 950.

The data augmentation step 910 may refer to a step of increasing the number of image data including a specific object.

The data augmentation step 910 may be a step of modifying image data and generating the modified image data as input data. The data augmentation step 910 may be a step of changing pixels of image data and acquiring new image data.

The data augmentation step 910 may be a step of reversing, randomly cropping or scaling image data to acquire new image data.

The feature extraction step 930 may be a step of extracting an input feature vector from image data after the data augmentation step 910.

The classification step 950 may be a step of acquiring a target feature vector from the extracted input feature vector and determining the type of an object corresponding to the image data through the acquired target feature vector.

FIG. 5 will be described again.

The processor 180 determines whether the recognized object matches the acquired object information (S509).

The processor 180 may determine whether the recognized object is equal to an object corresponding to the intention of the speech command.

The processor 180 may determine whether the object identification information determined through the object recognition model 800 coincides with the object corresponding to the speech command.

The processor 180 outputs a notification indicating that the object has been searched, upon determining that the recognized object matches the object information (S511).

In one embodiment, the processor 180 may output a notification indicating that the object corresponding to the speech command has been searched through the sound output unit 152.

The processor 180 may transmit the notification indicating that the object corresponding to the speech command has been searched to the mobile terminal of the user through the communication unit 110. In this case, the notification may include one or more of a message indicating that the object has been searched and position information of the searched object on a cleaning map.

The message indicating that the object has been searched and the position information of the searched object may be displayed on the display of the mobile terminal.

The user may easily confirm the position of the lost object through the notification received from the artificial intelligence robot 100-1.

According to the embodiment of the present invention, the artificial intelligence robot 100-1 may recognize the lost object during cleaning and enable the user to easily find the object which the user wants to find.

FIG. 10 is a view illustrating a table including object identification information and position information of an object on a cleaning map, which are acquired by an artificial intelligence robot of the present invention.

Referring to FIG. 10, a table 1000 shows the identification information and coordinates of the searched objects while the artificial intelligence robot 100-1 travels along a cleaning route.

The processor 180 may store object information acquired during cleaning in the memory 170.

The table 1000 may include information on first to third objects.

The information on the first object may include a remote controller which is the identification information of the first object and first coordinates of the remote controller on the cleaning map.

The information on the second object may include a ring which is the identification information of the second object and second coordinates of the ring on the cleaning map.

The information on the third object may include a remote controller which is the identification information of the third object and third coordinates of the remote controller on the cleaning map.

Figure 11:
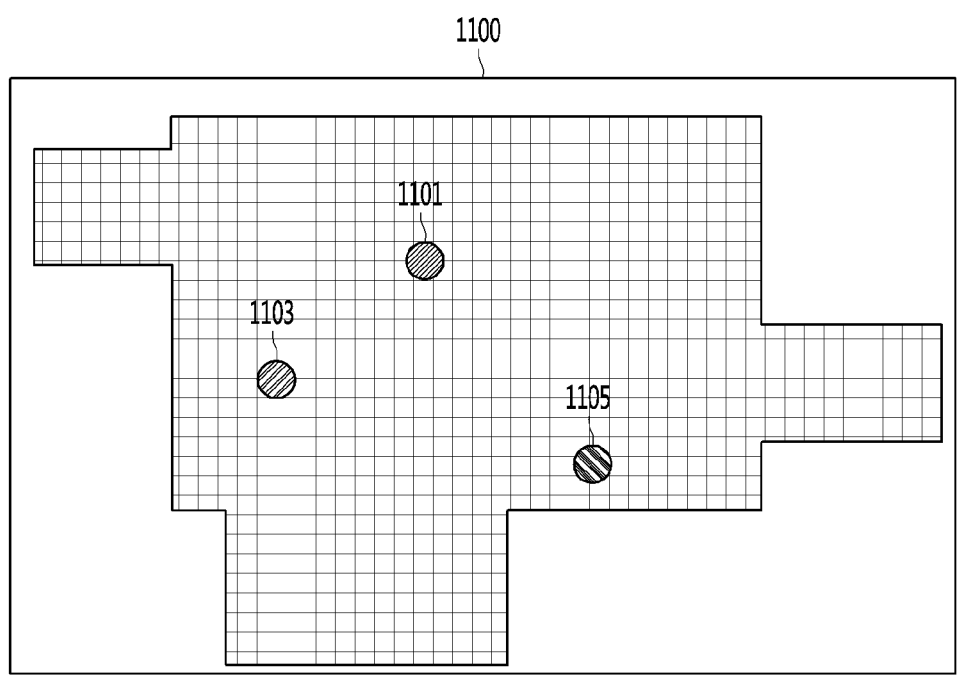
FIG. 11 is a view illustrating an example of displaying the position of the object acquired in FIG. 10 on the cleaning map.

FIG. 11 is a view illustrating an example of displaying the position of the object acquired in FIG. 10 on the cleaning map.

Referring to FIG. 11, the cleaning map 110 of the cleaning area stored in the artificial intelligence robot 100-1 is shown.

The processor 180 may prepare the cleaning map 1100 of the cleaning area according to a simultaneous localization and mapping (hereinafter referred to as an SLAM) and store the prepared cleaning map 1100 in the memory 170.

The processor 180 may identify the coordinates of the searched object during cleaning on the cleaning map 1100.

For example, the processor 180 may identify the coordinates 1101 of the first object, the coordinates 1103 of the second object and the coordinates 1105 of the third object shown in FIG. 10 on the cleaning map 1100.

Meanwhile, among the positions of the objects on the cleaning map 1100, the position of the object which the user wants to find may be transmitted to the mobile terminal 700 of the user.

Figure 12:
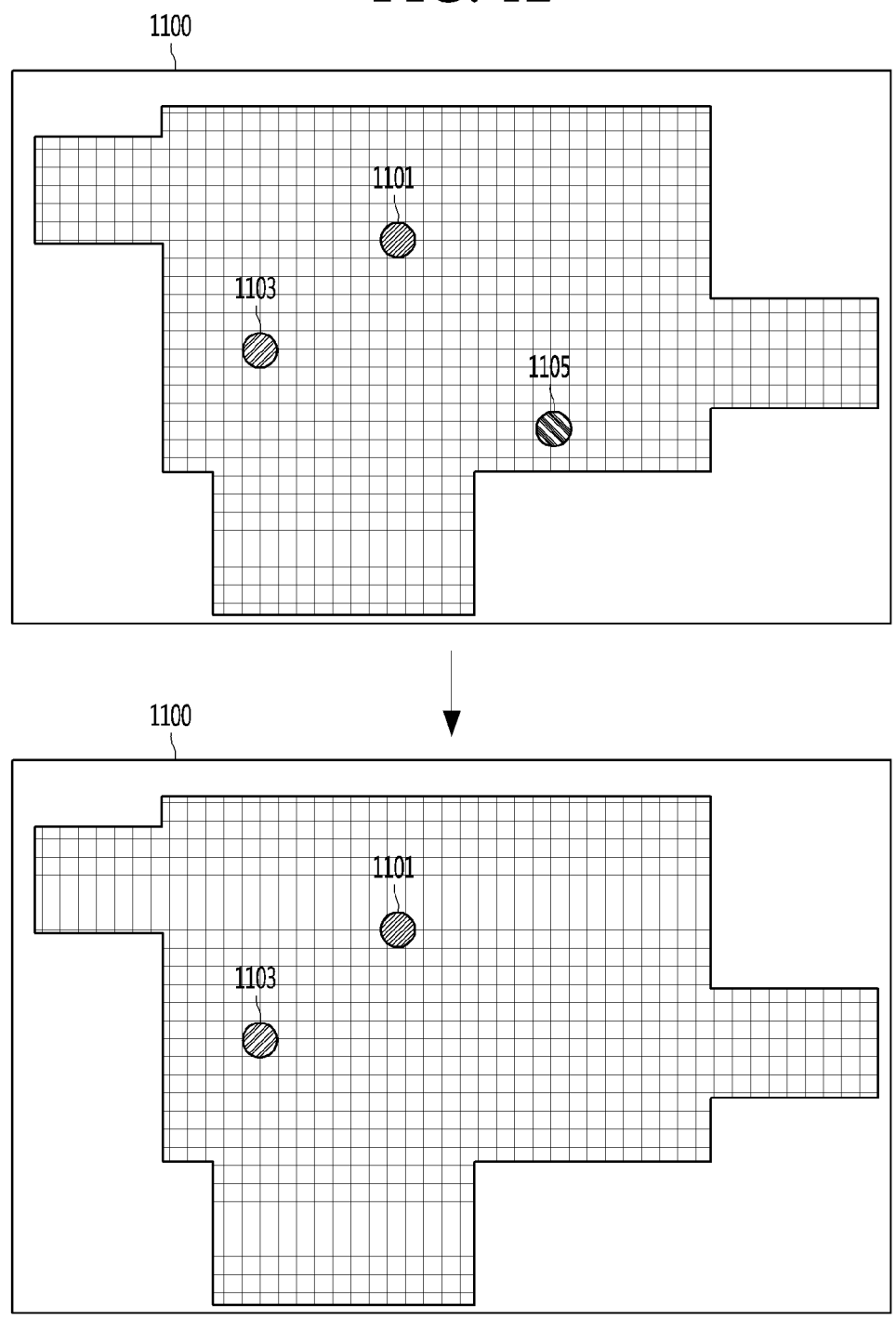
FIGS. 12 and 13 are views illustrating a process of transmitting position information of an object corresponding to a speech command of a user to a mobile terminal of the user according to an embodiment of the present invention.
Figure 13:
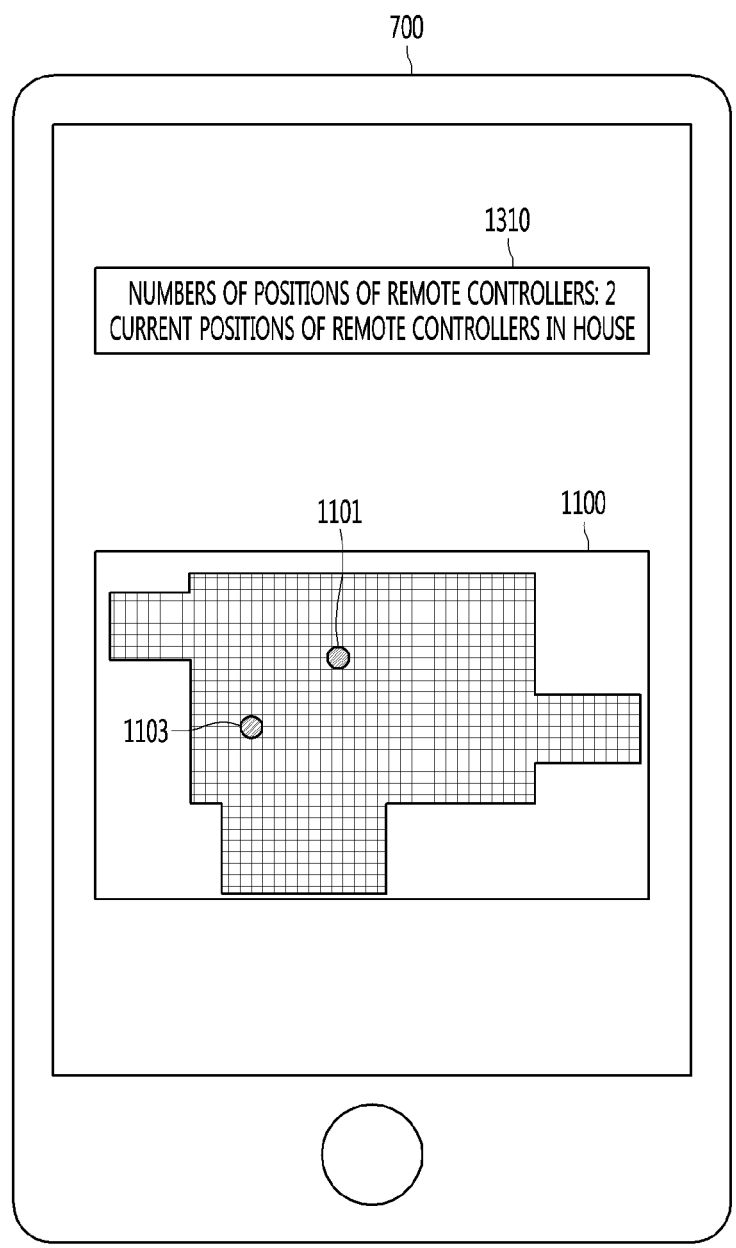

FIGS. 12 and 13 are views illustrating a process of transmitting position information of an object corresponding to a speech command of a user to a mobile terminal of the user according to an embodiment of the present invention.

First, referring to FIG. 12, the processor 180 may extract the coordinates of the object corresponding to the speech command of the user among the first to third coordinates 1101, 1103 and 1105 on the cleaning map 1100.

When the user utters a speech commanding for finding the remote controller, the processor 180 may extract the first coordinates 1101 and the second coordinates 1103 corresponding to the remote controller on the cleaning map 1100.

The processor 180 may transmit the cleaning map 1100 and the first coordinates 1101 and the second coordinates 1103 identified on the cleaning map 1100 to the mobile terminal 700 through the communication unit 110.

Referring to FIG. 13, the mobile terminal 700 may display information on the position of the remote controller received from the artificial intelligence robot 100-1.

That is, the mobile terminal 700 may display a message 1310 indicating that the artificial intelligence robot 100-1 has searched for the remote controller and the cleaning map 1100 including the positions 1101 and 1103 of the remote controllers.

The message 1310 may include the number of objects corresponding to the speech command of the user and the names of the objects.

The user may easily grasp the object which the user wants to find, through the positions 1101 and 1103 of the remote controllers identified on the cleaning map 1100.

That is, the user can easily confirm the position of the object, by only uttering the command for finding the object which the user wants to find. Therefore, even if the user loses an object, the user can rapidly find the lost object, thereby maximizing convenience.

Meanwhile, the artificial intelligence robot 100-1 may correct the cleaning route when the object corresponding to the search intention of the user is recognized.

Figure 14:
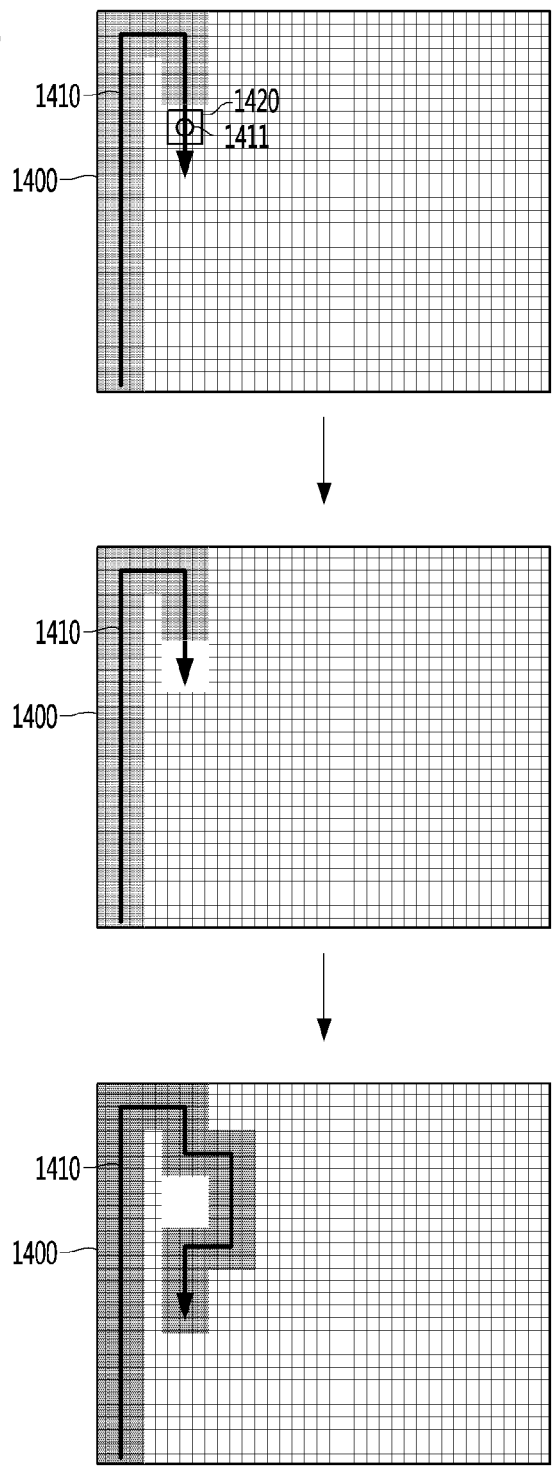
FIG. 14 is a view illustrating a process of regenerating a cleaning route when an object matching a search intention of a user is searched according to an embodiment of the present invention.

FIG. 14 is a view illustrating a process of regenerating a cleaning route when an object corresponding to a search intention of a user is searched according to an embodiment of the present invention.

Referring to FIG. 14, a first cleaning route 1410 indicating a route, along which the artificial intelligence robot 100-1 travels, on a cleaning map 1400 is shown.

The artificial intelligence robot 100-1 may search for the object corresponding to the search command of the user during traveling along the first cleaning route 1410 and acquire the position 1411 of the searched object.

The processor 180 may regenerate the cleaning route, when a grid area 1420 including the position 1411 of the searched object is included in the first cleaning route 1410.

Specifically, the processor 180 may remove the grid area 1420 including the position of the object on the first cleaning route 1410 from the route.

Thereafter, the processor 180 may change the first cleaning route 1410 to a second cleaning route 1430, after removing the grid area 1420.

The processor 180 may travel along the changed second cleaning route 1430.

Therefore, the artificial intelligence robot 100-1 may not suck in the object which the user wants to find.

Next, FIG. 15 will be described.

Figure 15:
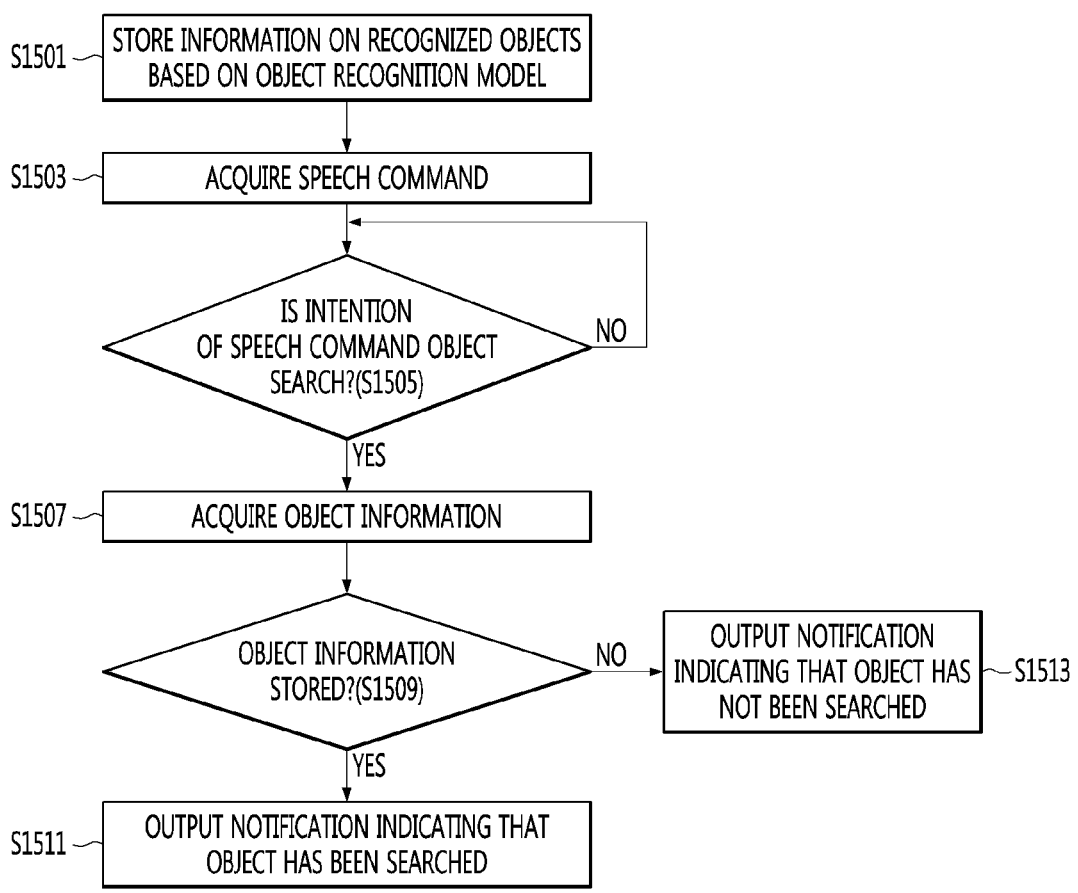
FIG. 15 is a view illustrating a method of operating an artificial intelligence robot according to another embodiment of the present invention.

FIG. 15 is a view illustrating a method of operating an artificial intelligence robot according to another embodiment of the present invention.

FIG. 15 shows an embodiment in which the artificial intelligence robot 100-1 stores information on objects recognized along the cleaning route and provides information on an object corresponding to the speech command of the user after finishing cleaning.

In contrast, FIG. 5 shows an embodiment in which the artificial intelligence robot 100-1 may provide information on the object corresponding to the speech command of the user while performing cleaning along the cleaning route.

A description of FIG. 15 overlapping the description of FIG. 5 will be omitted.

The processor 180 stores information on the recognized objects in the memory 170 during cleaning, based on the object recognition model (S1501).

The processor 180 may determine the type of the object based on the image captured through the camera 121 and the object recognition model while traveling along the cleaning route.

The processor 180 may store the identification information of the object corresponding to the determined type of the object and the position information of the recognized object on the cleaning map in the memory 170.

The table 1000 of FIG. 10 shows information on the objects acquired while the artificial intelligence robot 100-1 travels along the cleaning route.

Thereafter, the processor 180 acquires the speech command (S1503).

The processor 180 determines whether the intention of the acquired speech command is object search (S1505).

When the intention of the acquired speech command is object search, the processor 180 acquires information on an object for search (S1507).

The information on the object may be information for identifying the object and may include one or more of the name of the object or the type of the object.

The processor 180 determines whether the information on the object corresponding to the speech command is stored (S1509).

The processor 180 may compare the acquired information on the object with the information on the objects prestored in the memory 170.

When the identification information of the acquired object is stored in the memory 170, the processor 180 outputs a notification indicating that the object has been searched (S1511).

The output of the notification was described with reference to FIG. 13.

When the identification information of the acquired object is not stored in the memory 170, the processor 180 outputs a notification indicating that the object has not been searched (S1513).

When the object information corresponding to the speech command of the user is not stored in the memory 170, the processor 180 may output a notification indicating that the object has not been searched through the sound output unit 152.

In another example, when the object information corresponding to the speech command of the user is not stored in the memory 170, the processor 180 may transmit the notification indicating that the object has not been searched to the mobile terminal 700 of the user.

According to the embodiment of the present invention, the artificial intelligence robot 100-1 can find the lost object of the user during cleaning, thereby diversifying usability of the artificial intelligence robot 100-1.

The present invention mentioned in the foregoing description can also be embodied as computer readable codes on a computer-readable recording medium. Examples of possible computer-readable mediums include HDD (Hard Disk Drive), SSD (Solid State Disk), SDD (Silicon Disk Drive), ROM, RAM, CD-ROM, a magnetic tape, a floppy disk, an optical data storage device, etc. The computer may include the processor 180 of the artificial intelligence device.

The invention claimed is:

1. An artificial intelligence robot comprising:
a camera configured to acquire image data;
a memory configured to store an object recognition model; and
a processor configured to:
acquire a speech command;
determine whether an intention of the acquired speech command is object search;
recognize an object from the image data based on the object recognition model during traveling according to a first cleaning route when the intention represents the object search;
output a notification indicating that the object has been recognized when the recognized object is an intended object;
identify a position of the recognized object on a cleaning map including a plurality of cleaning areas when the object is recognized from the image data; and
change the first cleaning route to a second cleaning route such that a cleaning area including the position of the object on the first cleaning route is removed,
wherein the processor is further configured to:
acquire identification information of the intended object; and
determine that the intended object has been searched when the acquired identification information of the object matches identification information of the recognized object.

2. The artificial intelligence robot according to claim 1, wherein the identification information of the object includes a name or type of the object.

3. The artificial intelligence robot according to claim 2, further comprising a speaker configured to output audio, wherein the processor outputs the notification through the speaker.

4. The artificial intelligence robot according to claim 1, further comprising a short-range wireless communication module configured to wirelessly communicate with a mobile terminal, wherein the processor transmits the notification to the mobile terminal through the short-range wireless communication module, and wherein the notification includes position information indicating the position of the recognized object on the cleaning map.

5. The artificial intelligence robot according to claim 1, wherein the object recognition model is an artificial neural network model learned by a deep learning algorithm or a machine learning algorithm.

6. The artificial intelligence robot according to claim 5, wherein the object recognition model is learned through supervised learning and is a model for determining identification information of an object using image data for learning and object identification data labeled with the image data for learning.

7. A method of operating an artificial intelligence robot, the method comprising:

acquiring a speech command;

determining that an intention of the acquired speech command is object search;

acquiring image data based on determining that the intention is object search;

recognizing an object from the image data based on an object recognition model during raveling according to a first cleaning route, based on the intention representing the object search;

outputting a notification indicating that the object has been recognized, based on the recognized object being an intended object;

identifying a position of the recognized object on a cleaning map including a plurality of cleaning areas, based on the object being recognized from the image data;

changing the first cleaning route to a second cleaning route such that a cleaning area including the position of the object on the first cleaning route is removed;

acquiring identification information of the intended object; and determining that the intended object has been searched, based on the acquired identification information of the object matching identification information of the recognized object.

8. The method according to claim 7, wherein the identification information of the object includes a name or type of the object.

9. The method according to claim 7, further comprising transmitting the notification to a mobile terminal, and wherein the notification includes position information indicating the position of the recognized object on the cleaning map.

10. The method according to claim 7, wherein the object recognition model is an artificial neural network model learned by a deep learning algorithm or a machine learning algorithm, is learned through supervised learning, and is a model for determining identification information of an object using image data for learning and object identification data labeled with the image data for learning.

* * * * *